Patented Mar. 14, 1944

2,344,268

UNITED STATES PATENT OFFICE 2,344,268

CLEANING COMPOSITION

Harry D. Rench, Racine, Wis., assignor to Bigelow-Sanford Carpet Co., Inc., Thompsonville, Conn., a corporation of Massachusetts No Drawing. Application March 11, 1942, Serial No. 434,299

3 Claims. (Cl. 252—163)

This invention relates to compositions for cleaning fabrics, particularly adapted for removing from the pile of a pile fabric dirt that is adhered thereto by grease.

The object of my invention is to improve the physical characteristics of cleaning compositions of the sort made of a mixture of a finely-divided solid absorbent clay and a volatile organic grease solvent mixed together in amounts to form a moist powder. By my invention, I have greatly reduced the ability of such moist powder compositions to form lumps while being stored so that, when applied to the pile fabric, the composition can readily be distributed evenly over the pile surface without an excessive amount being applied to some portions of the surface and an insufficient amount to others. The composition is, accordingly, more easily applied and distributed. It is also more easily removed, preferably by vacuum cleaning.

I have attained these objects by the provision of a cleaning composition consisting of a uniform mixture, with a colloidal clay such as bentonite or fuller's earth and a volatile organic grease solvent, of wood flour in predetermined particle size.

The following is a formula of a composition embodying my invention which I have used successfully in practice:

| | Pounds |
|---|---|
| Bentonite (200 mesh) | 65 |
| Volatile organic grease solvent | 25 |
| Wood flour (60 mesh) | 10 |

The wood flour and bentonite are thoroughly mixed together while dry. The solvent is thereafter added to the dry mixture with agitation in a suitable mixer until an even moist powder consistency is obtained. The moistness of the powder should be preserved until the composition is to be used, and the use of air-tight containers to inhibit evaporation during storage is preferable.

I have found that a composition made as above may be stored for long periods of time and when the container is thereafter opened and the composition spread onto the floor covering very few lumps are present and any that may be present are of small, unobjectionable size and are readily broken up. Accordingly, the composition can readily be spread over the surface of the pile fabric and evenly distributed thereover. The composition is then brushed into the pile until most of it has disappeared from the pile surface. The solvent is then allowed to evaporate and the dry powder remaining can readily be removed by vacuum cleaning.

When bentonite is used as the colloidal clay it should not be finer than 300 mesh nor coarser than 100 mesh, but I prefer approximately 200 mesh. If fuller's earth is used as the clay, I have found that its greater absorbency at 300 mesh commends that size and it should not be much coarser than 200 mesh.

The solvent is one which readily dissolves grease and has such a flash point that it will evaporate at a moderate rate and yet not present a fire hazard. The flash point should be higher than 80° F. and lower than 145° F. and may be between 90° F. and 130° F., but is preferably between approximately 100° F. and 120° F. A moderate evaporation rate is desirable so that the material can be brushed into the pile without undue loss of solvent and yet so that the solvent can evaporate from within the pile to leave a dry powder that can readily be removed by vacuum cleaning. Within those limits I prefer a volatile organic solvent consisting of any of the petroleum distillates, of which Stoddard's solvent having a flash point of about 100° F. or higher is typical, although my invention is not to be limited thereto and carbon tetrachloride can be used.

The wood flour should not be coarser than 30 mesh nor finer than 100 mesh. It is preferably approximately 60 mesh. The amount of wood flour used should be substantial but should not exceed one-half of the amount of the clay by weight.

The amount of solvent relative to the amounts of solids (clay and wood flour) should produce a moist powder consistency which will enable the composition to be brushed into the pile effectively and yet, upon evaporation of the solvent, leave a dry powder residue which can readily be removed. In the formula above set forth the solvent is present in an amount approximating 6 gallons per 100 pounds dry solids composed of clay and wood flour. I prefer to employ between 5 or 6 gallons per 100 pounds dry solids and, although this ratio may vary somewhat, less than 4 gallons of solvent is usually too dry and over 7 gallons tends toward undesirable pastiness and separation of liquid from solids during storage.

I am aware that cleaning materials having solid absorbents and grease solvents have been proposed prior to my invention. But the use of such materials, particularly for cleaning the pile tufts of a pile fabric, presents a problem of manageability resulting both from the physical characteristics of the material itself and from the peculiar structure presented by the tread surface of a pile fabric. I have found that a cleaning composition embodying my invention solves this problem and cleans effectively.

I claim:

1. A cleaning composition for removing from fabrics dirt adhered thereto by grease which consists of a mixture of approximately 200 mesh bentonite, approximately 60 mesh wood flour and a petroleum distillate grease solvent, the solvent being present in an amount between 4 and 7 gallons of solvent per 100 pounds of combined dry clay and wood flour to impart a moist powder consistency to the composition and the wood flour being present in an amount less than one-half the weight of the bentonite to inhibit lumping of the composition during storage.

2. A cleaning composition for removing from fabrics dirt adhered thereto by grease which consists of a mixture of wood flour, approximately 100 to 300 mesh absorbent colloidal clay and a petroleum distillate grease solvent having a flash point above 80° F. and below 145° F., the solvent being present in an amount between 5 and 6 gallons of solvent per 100 pounds of combined dry clay and wood flour to impart a moist powder consistency to the composition, and the wood flour being of a fineness of between approximately 30 mesh and 100 mesh and being present in an amount less than one-half the weight of the clay to inhibit lumping of the composition during storage.

3. A cleaning composition for removing from fabrics dirt adhered thereto by grease which consists of a mixture, by weight, of approximately 65 pounds approximately 200 mesh bentonite, approximately 60 mesh wood flour in an amount no less than approximately 10 pounds and no more than approximately one-half the weight of the bentonite, and approximately 25 pounds of a petroleum distillate grease solvent having a flash point above 80° F. and below 145° F.

HARRY D. RENCH.